US012739160B2

(12) United States Patent
Iwai et al.

(10) Patent No.: US 12,739,160 B2
(45) Date of Patent: Sep. 15, 2026

(54) TERMINAL, BASE STATION, AND COMMUNICATION REFERENCE SIGNAL TRANSMISSION METHOD

(71) Applicant: Panasonic Intellectual Property Corporation of America, Torrance, CA (US)

(72) Inventors: Takashi Iwai, Ishikawa (JP); Tetsuya Yamamoto, Kanagawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 600 days.

(21) Appl. No.: 18/005,044

(22) PCT Filed: Jun. 22, 2021

(86) PCT No.: PCT/JP2021/023665
§ 371 (c)(1),
(2) Date: Jan. 10, 2023

(87) PCT Pub. No.: WO2022/014279
PCT Pub. Date: Jan. 20, 2022

(65) Prior Publication Data

US 2023/0308330 A1 Sep. 28, 2023

(30) Foreign Application Priority Data

Jul. 15, 2020 (JP) ................................ 2020-121431

(51) Int. Cl.
*H04B 1/7143* (2011.01)
*H04L 5/00* (2006.01)
(Continued)

(52) U.S. Cl.
CPC ....... *H04L 27/2613* (2013.01); *H04B 1/7143* (2013.01); *H04L 5/0048* (2013.01); *H04W 72/0453* (2013.01)

(58) Field of Classification Search
CPC . H04B 1/7143; H04L 27/2613; H04L 5/0012; H04L 5/0048; H04L 5/0051; H04L 5/0094; H04L 5/0007; H04W 72/0453
See application file for complete search history.

(56) References Cited

U.S. PATENT DOCUMENTS

2010/0273494 A1 10/2010 Iwai et al.
2013/0189930 A1 7/2013 Kinnunen et al.
(Continued)

FOREIGN PATENT DOCUMENTS

CN 108809587 A 11/2018
CN 110072286 A * 7/2019
(Continued)

OTHER PUBLICATIONS

European Search Report dated Nov. 3, 2023, for the corresponding European Patent Application No. 21841804.4, 10 pages.
(Continued)

*Primary Examiner* — Asad M Nawaz
*Assistant Examiner* — Natali Pascual Peguero
(74) *Attorney, Agent, or Firm* — Seed Intellectual Property Law Group LLP

(57) ABSTRACT

The present invention achieves an improvement in channel estimation accuracy using a reference signal. This terminal comprises: a control circuit for setting a first upper limit value of a frequency interval at which a first reference signal is placed in a first bandwidth such that the first upper limit value is smaller than a second upper limit value of a frequency interval at which a second reference signal is placed in a second bandwidth wider than the first bandwidth;
(Continued)

and a transmission circuit for transmitting the first reference signal on the basis of the first upper limit value.

22 Claims, 17 Drawing Sheets

(51) Int. Cl.
*H04L 27/26* (2006.01)
*H04W 72/0453* (2023.01)

(56) References Cited

U.S. PATENT DOCUMENTS

| | | | | |
|---|---|---|---|---|
| 2019/0044683 | A1 | 2/2019 | Wu et al. | |
| 2020/0044805 | A1* | 2/2020 | Iwai | H04W 52/365 |
| 2020/0077398 | A1* | 3/2020 | Yoo | H04L 27/2613 |
| 2020/0280404 | A1 | 9/2020 | Qin et al. | |

FOREIGN PATENT DOCUMENTS

| | | | |
|---|---|---|---|
| JP | 2010220258 | A | 9/2010 |
| WO | 2019096244 | A1 | 5/2019 |

OTHER PUBLICATIONS

European Communication pursuant to Article 94(3) EPC, dated Apr. 10, 2025, for European Patent Application No. 21841804.4. (6 pages).

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; NR; Physical channels and modulation (Release 16)," 3GPP TS 38.211 V16.1.0, Mar. 2020. (130 pages).

3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018. (39 pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019. (367 pages).

International Search Report, mailed Aug. 17, 2021, for International Patent Application No. PCT/JP2021/023665. (4 pages) (with English translation).

ITU, "IMT Vision—Framework and overall objectives of the future development of IMT for 2020 and beyond," Recommendation ITU-R M.2083-0, Sep. 2015. (21 pages).

Samsung, "WID proposal for Rel.17 enhancements on MIMO for NR," Agenda Item: 9.1.1, RP-192436, 3GPP TSG RAN Meeting #86, Sitges, Spain, Dec. 9-12, 2019. (8 pages).

3GPP, "3rd Generation Partnership Project; Technical Specification Group Radio Access Network; NR; Physical channels and modulation (Release 16)," 3GPP TS 38.211 V16.2.0, Jun. 2020. (131 pages).

* cited by examiner

| SRS transmission bandwidth | Number of transmission Combs [sc] | Sequence length [sc] |
| --- | --- | --- |
| 4[RB] | 2 | 24 (=4*12/2) |
| | 4 | 12 (=4*12/4) |
| | 8 | 6 (=4*12/8) |
| 2[RB] | 2 | 12 (=2*12/2) |
| | 4 | 6 (=2*12/4) |
| | 8 | 3 (=2*12/8) |
| 1[RB] | 2 | 6 (=1*12/2) |
| | 4 | 3 (=1*12/4) |
| | 8 | 1 or 2 (=1*12/8) |

FIG. 2

| SRS transmission bandwidth | Available number of transmission Combs [sc] |
|---|---|
| 4[RB] or more | 2 |
| | 4 |
| | 8 |
| 2[RB] | 2 |
| | 4 |
| 1[RB] | 2 |

FIG. 8

| SRS transmission bandwidth [RB] | Number of transmission Combs [sc] | Sequence length [sc] |
|---|---|---|
| 4 | 2 | 24 (=4*12/2) |
| | 4 | 12 (=4*12/4) |
| | 8 | 6 (=4*12/8) |
| 2 | 2 | 12 (=2*12/2) |
| | 4 | 6 (=2*12/4) |
| 1 | 2 | 6 (=1*12/2) |

FIG. 9

| SRS transmission bandwidth | Available number of transmission Combs [sc] |
|---|---|
| 4[RB] or more | 1 |
| | 2 |
| | 4 |
| 2[RB] | 1 |
| | 2 |
| 1[RB] | 1 |

FIG. 10

| SRS transmission bandwidth [RB] | Number of transmission Combs [sc] | Sequence length [sc] |
|---|---|---|
| 4 | 1 | 48 (=4*12/1) |
| | 2 | 24 (=4*12/2) |
| | 4 | 12 (=4*12/4) |
| 2 | 1 | 24 (=2*12/1) |
| | 2 | 12 (=2*12/2) |
| 1 | 1 | 12 (=1*12/1) |

FIG. 11

TERMINAL, BASE STATION, AND COMMUNICATION REFERENCE SIGNAL TRANSMISSION METHOD

TECHNICAL FIELD

The present disclosure relates to a terminal, a base station, and a communication method.

BACKGROUND ART

In Release 17 of 3rd Generation Partnership Project (3GPP (hereinafter referred to as "Rel. 17"), for the functional extension of Multiple-Input Multiple Output (MIMO) applied to New Radio access technology (NR), improving the coverage performance or capacity performance of a Sounding Reference Signal (SRS) has been discussed (e.g., see Non-Patent Literature (hereinafter referred to as "NPL") 1).

CITATION LIST

Non-Patent Literature

NPL 1

RP-192436, "WID proposal for Rel.17 enhancements on MIMO for NR," Samsung, December 2019

NPL 2

3GPP TS 38.211 V16.1.0, "NR; Physical channels and modulation (Release 16)," 2020-03

SUMMARY OF INVENTION

However, there is scope for further study on a method for improving channel estimation accuracy by using a reference signal.

One non-limiting and exemplary embodiment facilitates providing a terminal, a base station, and a communication method each capable of improving channel estimation accuracy by using a reference signal.

A terminal according to an exemplary embodiment of the present disclosure includes: control circuitry, which, in operation, sets a first upper limit value of a frequency spacing in which a first reference signal is placed in a first bandwidth to be smaller than a second upper limit value of a frequency spacing in which a second reference signal is placed in a second bandwidth which is wider than the first bandwidth; and transmission circuitry, which, in operation, transmits the first reference signal, based on the first upper limit value.

It should be noted that general or specific embodiment may be implemented as a system, a method, an integrated circuit, a computer program, a storage medium, or any selective combination thereof.

According to an exemplary embodiment of the present disclosure, it is possible to improve channel estimation accuracy by using a reference signal.

Additional benefits and advantages of the disclosed embodiment will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 2 illustrates an exemplary relation between an SRS transmission bandwidth, the number of transmission Combs and a sequence length for SRS generation;

FIG. 8 illustrates an exemplary relation between an SRS transmission bandwidth and the number of transmission Combs according to Embodiment 1;

FIG. 9 illustrates an exemplary relation between the SRS transmission bandwidth, the number of transmission Combs, and a sequence length for SRS generation according to Embodiment 1;

FIG. 10 illustrates another exemplary relation between the SRS transmission bandwidth and the number of transmission Combs according to Embodiment 1;

FIG. 11 illustrates another exemplary relation between the SRS transmission bandwidth, the number of transmission Combs and a sequence length for SRS generation according to Embodiment 1;

DESCRIPTION OF EMBODIMENTS

Figure 1:
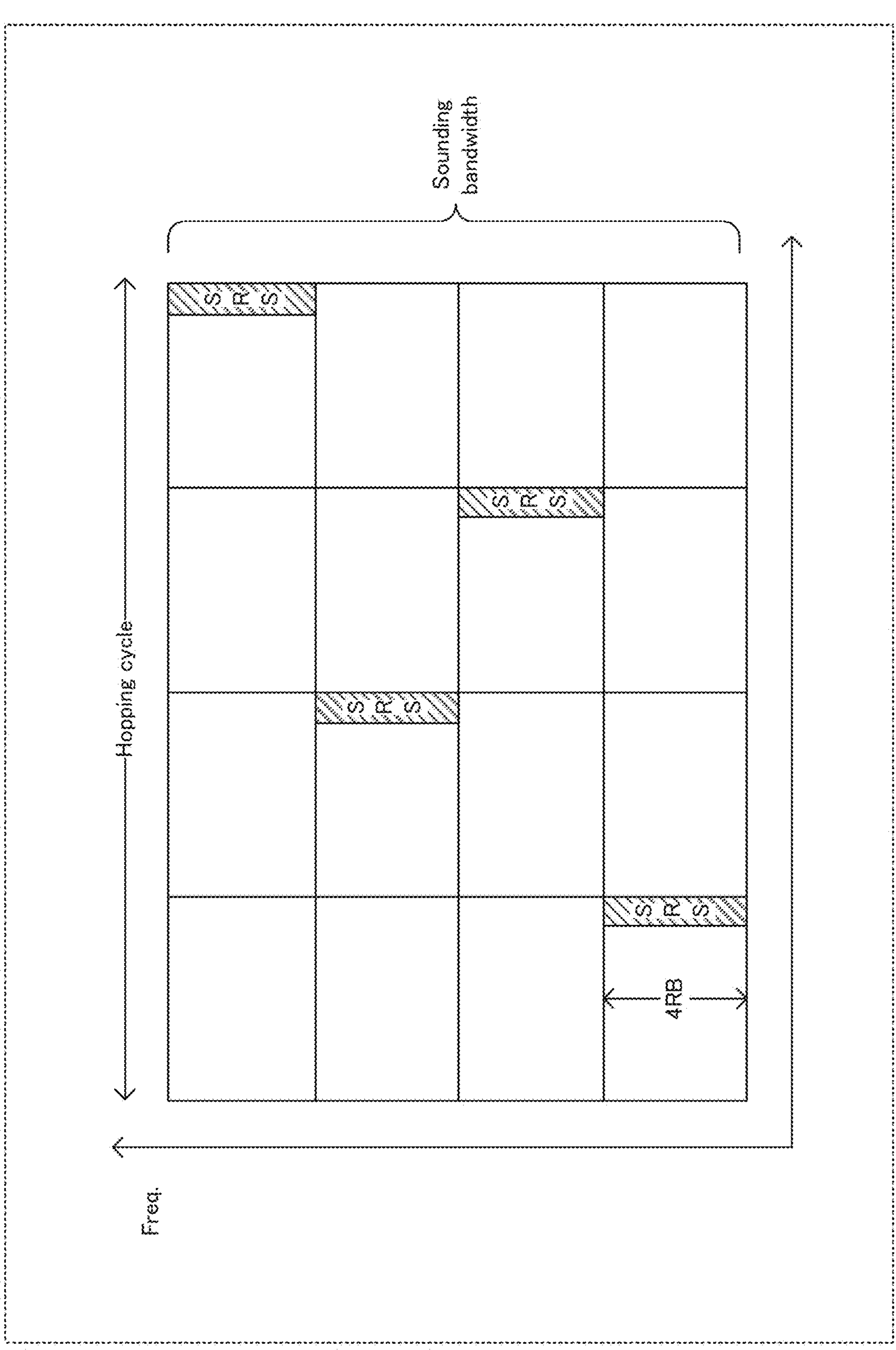
FIG. 1 illustrates a transmission example of a narrowband Sounding Reference Signal (SRS)

Hereinafter, an embodiment of the present disclosure will be described in detail with reference to the accompanying drawings.

For an SRS used in NR (e.g., referred to as "NR SRS"), for example, a base station (e.g., sometimes referred to as "eNB" or "gNB") may indicate (or configure) information on a configuration of an SRS (hereinafter referred to as "SRS configuration information") to a terminal (e.g., sometimes referred to as "User Equipment" (UE)). For the SRS configuration information, for example, "SRS resource set" may be defined, which is a parameter group used for each SRS resource, such as a transmission timing of an SRS, a transmission frequency band for an SRS, a sequence number for reference signal generation, the number of transmission Combs (or transmission subcarrier spacing), and a cyclic shift amount. The SRS configuration information may be configured by, for example, higher layer signaling such as a Radio Resource Control (RRC) layer. The SRS configuration information is also sometimes referred to as, for example, "SRS-Config" which is configured in the RRC layer.

Examples of transmission methods of an NR SRS in a frequency band include a "broadband SRS transmission method" and a "narrowband SRS transmission method." The broadband may be, for example, a band corresponding to a frequency band in which an SRS can be transmitted (e.g., referred to as "Sounding band (sounding bandwidth)" or "channel estimatable frequency band"). Further, the narrowband may be, for example, a band narrower than the Sounding band (or broadband). In the broadband SRS transmission method, for example, an SRS may be transmitted in a transmission bandwidth corresponding to a Bandwidth part (BWP), and a broadband channel estimation may be performed at one time. On the other hand, in the narrowband SRS transmission method, for example, an SRS may be transmitted in a narrowband while temporally changing a transmission band (i.e., performing frequency hopping), and the broadband channel estimation may be performed by using narrowband SRSs for a plurality of times.

For example, a path loss at a terminal present near a boundary of a cell may be greater than at a terminal present near a center of the cell. In addition, a maximum transmission power of a terminal has an upper limit. Therefore, for example, when the terminal present near the boundary of the cell transmits an SRS in a broadband, received power per unit frequency in the base station is likely to be low. That is, when the terminal present near the boundary of the cell transmits an SRS in the broadband, received quality (e.g., Signal to Interference and Noise Ratio (SINR)) becomes low, and thus, the channel estimation accuracy may be deteriorated, for example. Accordingly, for example, to the terminal present near the boundary of the cell, the narrowband SRS transmission method may be applied in which transmission power allocation is narrowed down to a frequency band of a narrowband narrower than the broadband. (i.e., transmission power density is increased).

In contrast, for example, the path loss may be smaller at the terminal present near the center of the cell as compared to the terminal present near the boundary of the cell. Therefore, even when the terminal present near the center of the cell transmits an SRS in a broadband, since the received power per unit frequency for channel estimation in the base station can be ensured, the broadband SRS transmission method may be applied.

Further, for example, in the NR SRS, the Sounding band may be configured to be identical between terminals regardless of the broadband SRS and the narrowband SRS. In this case, for example, a transmission bandwidth for the broadband SRS may be configured to N times (N is integer) a transmission bandwidth for the narrowband SRS. For example, in a case where a terminal transmits the narrowband SRS, applying frequency hopping an N number of times (N-time) allows the estimation of channel quality in the same frequency band as the broadband SRS.

For example, in the NR SRS, the minimum transmission bandwidth for an SRS may be four resource blocks (RBs), and a transmission bandwidth for the SRS (e.g., number of RBs) (hereinafter may be referred to as SRS transmission bandwidth) may be a multiple of four (e.g., see NPL 2).

FIG. 1 illustrates a transmission example of a narrowband SRS in the NR SRS.

In FIG. 1, the Sounding bandwidth is 16 RBs, for example. By way of example, in FIG. 1, a terminal may perform frequency hopping four times with respect to the SRS (e.g., narrowband SRS) having the 4-RB transmission bandwidth.

In Rel. 17 of 3GPP, for example, in the narrowband SRS transmission, a method of configuring high transmission power density for an SRS (hereinafter referred to as SRS transmission power density) may be assumed. Increasing the SRS transmission power density can improve, for example, the channel estimation accuracy of a terminal with a large path loss, such as a terminal present near a boundary of a cell, thereby improving coverage performance of the SRS.

An example of the method of increasing the SRS transmission power density includes a method of narrowing a transmission bandwidth for an SRS or a method of increasing the number of transmission Combs (i.e., method of widening transmission subcarrier spacing). Moreover, for example, channel estimation over a broadband is assumed by applying the frequency-hopping to the narrowband SRS transmission.

However, the narrower the SRS transmission bandwidth is or the greater the number of transmission Combs is, the smaller a sequence length of a sequence for SRS generation may be. For example, the smaller the sequence length of the sequence for SRS generation becomes, the greater cross-correlation (or interference) between SRSs using different sequences is, which may deteriorate the channel estimation accuracy.

Further, the smaller the sequence length of the sequence for SRS generation is, the number of sequences having favorable Peak to Average Power Ratio (PAPR) characteristics or cross-correlation characteristics (e.g., Constant Amplitude Zero Auto Correlation (CAZAC) characteristics) may be reduced. For example, in NR, 30 sequences can be used in each transmission bandwidth as the sequence for SRS generation, and for adjacent cells, interference between adjacent cells can be reduced by transmitting an SRS generated from different sequences. For example, the smaller the sequence length of the sequence for SRS generation is, the greater the cross-correlation (or interference) is, which may deteriorate the channel estimation accuracy.

For example, "$M_{sc,b}^{SRS}$" that is a sequence length of a sequence for SRS generation may be calculated based on Equation 1 (e.g., see NPL 2).

[1]

$$M_{sc,b}^{SRS} = m_{SRS,b} N_{sc}^{RB} / K_{TC} \quad \text{(Equation 1)}$$

In Equation 1, $m_{SRS,b}$ represents the SRS transmission bandwidth [RB], $N_{sc}^{RB}$ represents the number of subcarriers per RB (sub carrier: sc) [sc/RB], and $K_{TC}$ represents the number of transmission Combs (Comb spacing) [sc].

In NR, for example, $N_{sc}^{RB}$=12 (may be fixed value). In this case, for example, a relation between the SRS transmission bandwidth (msRsb), the number of transmission Combs ($K_{TC}$), and sequence length ($M_{sc,b}^{SRS}$) is as illustrated in FIG. 2. For example, as illustrated in FIG. 2, when the SRS transmission bandwidth is equal to or less than two RBs, the sequence length may be equal to or less than a certain threshold value (e.g., three [sc]) depending on the number of transmission Combs. In one example, when the sequence length decreases to a certain threshold value or less a certain threshold value (e.g., three [sc]), the cross-correlation (interference) between SRSs becomes large, which may deteriorate the channel estimation accuracy with SRSs.

Hence, in an exemplary embodiment of the present disclosure, a description will be given of a method for improving the channel estimation accuracy using an SRS.

Embodiment 1

[Overview of Communication System]

A communication system according to an aspect of the present disclosure may include, for example, base station 100 (e.g., gNB or eNB) and terminal 200 (e.g., UE).

For example, base station 100 may be a base station for NR, and terminal 200 may be a terminal for NR. For example, base station 100 may configure, for terminal 200, SRS configuration information related to SRS transmission and receive an SRS from terminal 200. For example, terminal 200 may transmit, based on the SRS configuration information from base station 100, an SRS in certain bandwidth and the number of transmission Combs in a prescribed (or configured) transmission band.

Figure 3:
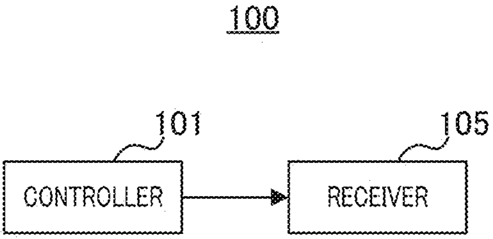
FIG. 3 is a block diagram illustrating an exemplary configuration of a part of a base station.

FIG. 3 is a block diagram illustrating an exemplary configuration of a part of base station 100 according to an aspect of the present disclosure. In base station 100 illustrated in FIG. 3, controller 101 (e.g., corresponding to control circuitry) sets a first upper limit value of a frequency spacing (e.g., number of transmission Combs) in which a first reference signal (e.g., SRS) is placed in a first bandwidth to be lower than a second upper limit value of a frequency spacing in which a second reference signal (e.g., SRS) is placed in a second bandwidth which is wider than the first band. Receiver 105 (e.g., corresponding to reception circuitry) receives the first reference signal based on the first upper limit value.

Figure 4:
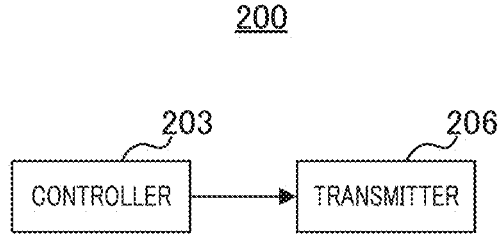
FIG. 4 is a block diagram illustrating an exemplary configuration of a part of a terminal.

FIG. 4 is a block diagram illustrating an exemplary configuration of a part of terminal 200 according to an aspect of the present disclosure. In terminal 200 illustrated in FIG. 4, controller 203 (e.g., corresponding to control circuitry) sets a first upper limit value of a frequency spacing (e.g., number of transmission Combs) in which a first reference signal (e.g., SRS) is placed in a first bandwidth to be lower than a second upper limit value of a frequency spacing in which a second reference signal (e.g., SRS) is placed in a second bandwidth which is wider than the first band. Transmitter 206 (e.g., corresponding to transmission circuitry) transmits the first reference signal based on the first upper limit value.

[Configuration of Base Station]

Figure 5:
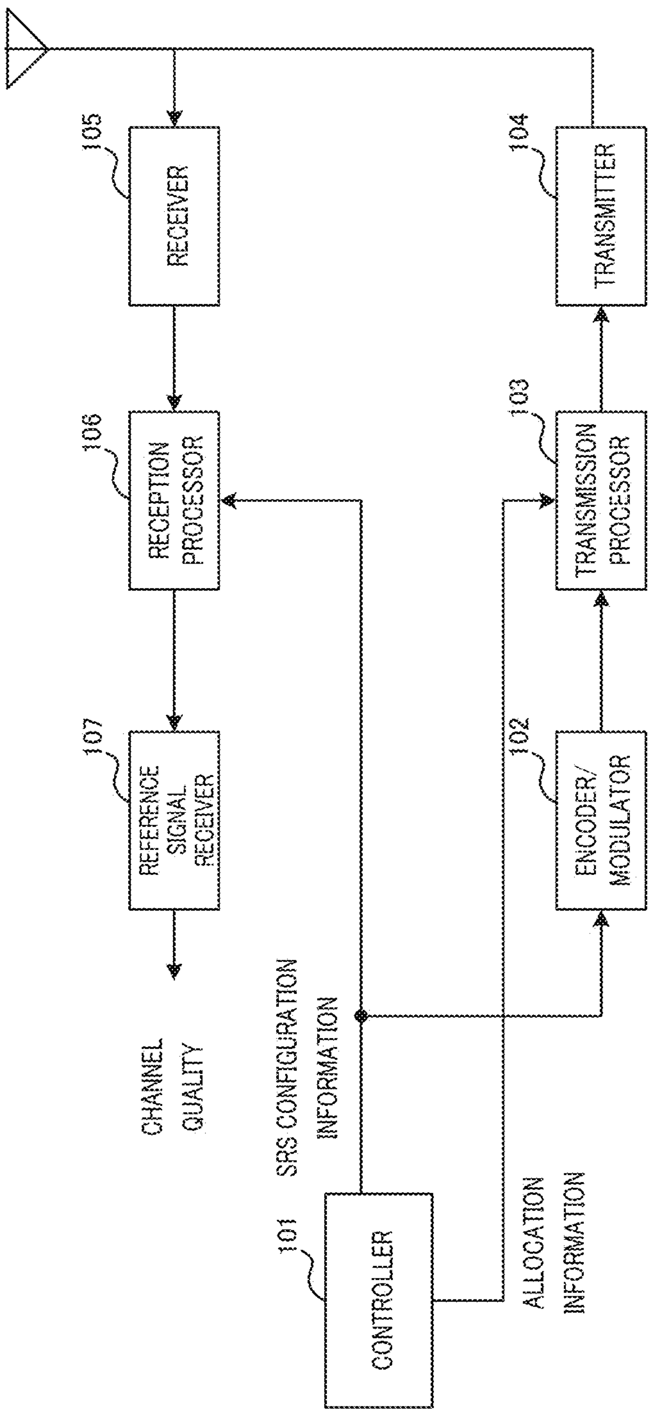
FIG. 5 is a block diagram illustrating an exemplary configuration of the base station.

FIG. 5 is a block diagram illustrating an exemplary configuration of base station 100 according to an aspect of the present disclosure. In FIG. 4, base station 100 may include, for example, controller 101, encoder/modulator 102, transmission processor 103, transmitter 104, receiver 105, reception processor 106, and reference signal receiver 107.

Controller 101 may control SRS scheduling, for example. In one example, controller 101 may generate the SRS configuration information for terminal 200 that is a target.

The SRS resource set of the SRS configuration information may include, a parameter such as a transmission frequency band for each SRS resource (including, e.g., transmission bandwidth, number of transmission Combs, or frequency hopping pattern), a transmission symbol position, the number of SRS ports, a sequence number for reference signal generation, a cyclic shift amount (e.g., Cyclic Shift value), or sequence hopping, for example.

Controller 101 may, for example, output the control information including the generated SRS configuration information to encoder/modulator 102. The SRS configuration information may be transmitted, for example, as control information for RRC layer (i.e., higher layer signaling or RRC signaling), to terminal 200 which is a target after transmission processing has been performed in encoder/modulator 102, transmission processor 103, and transmitter 104.

Further, controller 101 may, for example, control reception of the SRS based on the SRS configuration information. For example, controller 101 may output the SRS configuration information to reception processor 106.

Further, controller 101 may generate allocation information on a frequency resource for downlink data (e.g., RB), for example. Controller 101 may output, to transmission processor 103, the allocation information on a radio resource for the downlink data transmission, for example.

Encoder/modulator 102 may, for example, encode and modulate the SRS configuration information input from controller 101 and output the resulting modulation signal to transmission processor 103.

Transmission processor 103 may, for example, form a transmission signal by mapping the modulation signal input from encoder/modulator 102 to a frequency band in accordance with the allocation information on the radio resource for the downlink data transmission input from controller 101. For example, in a case where the transmission signal is an orthogonal frequency division multiplexing (OFDM) signal, transmission processor 103 may map the modulation signal to a frequency resource, convert the mapped signal into a time waveform through inverse fast Fourier transform (IFFT) processing, add a Cyclic Prefix (CP), and thereby form the OFDM signal.

Transmitter 104 may, for example, on the transmission signal input from transmission processor 103, perform transmission radio processing such as up-conversion and digital-analog (D/A) conversion, and transmit the transmission signal resulting from the transmission radio processing via an antenna.

Receiver 105 may, for example, on a radio signal received via the antenna, perform reception radio processing such as down-conversion and analog-to-digital (A/D) conversion, and output the received signal resulting from the reception radio processing to reception processor 106.

Reception processor 106 may, for example, identify a resource to which the SRS is mapped, based on the SRS configuration information input from controller 101, and extract a signal component mapped to the identified resource from the received signal. By way of example, in the case of Aperiodic SRS transmission, reception processor 106 may receive an SRS in a slot obtained by adding a slot offset configured in the SRS resource set(s) to the transmission timing of the DCI. Alternatively, for example, in the case of Semi-Persistent SRS transmission or Periodic SRS transmission, reception processor 106 may periodically receive SRSs in the slots identified by the transmission period and the slot offset configured in the SRS resource set. Further, reception processor 106 may, for example, identify a frequency resource for the SRS from the information on the transmission frequency band for the SRS resource included in the SRS configuration information.

Reception processor 106, for example, may output the SRS to reference signal receiver 107.

Reference signal receiver 107 may, for example, measure received quality of each frequency resource, based on the SRS input from reception processor 106, and output information on the received quality.

[Configuration of Terminal]

Figure 6:
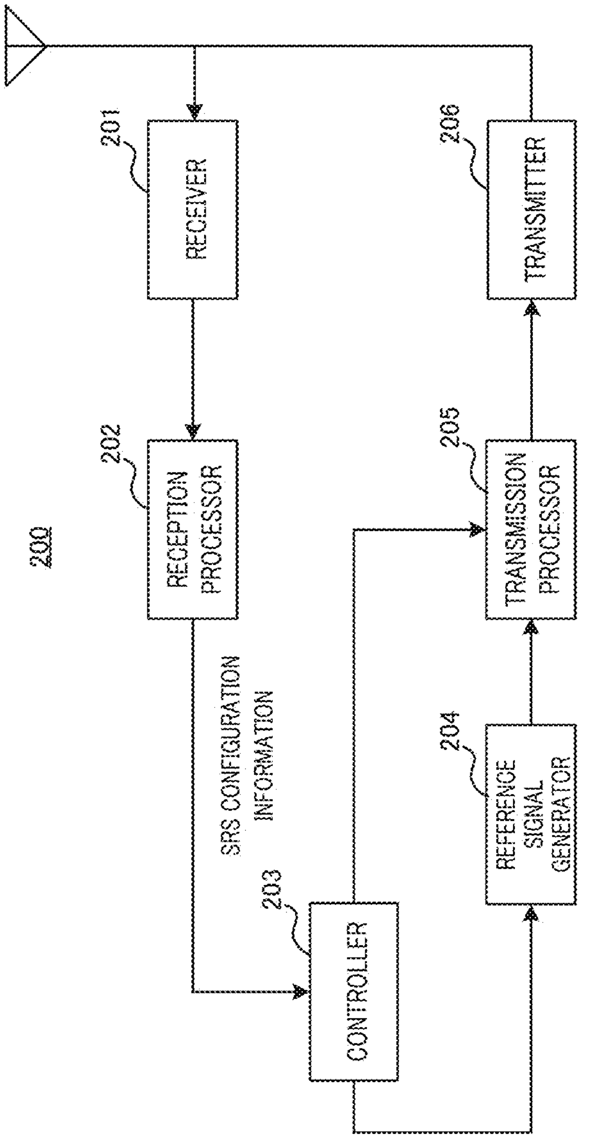
FIG. 6 is a block diagram illustrating an exemplary configuration of the terminal.

FIG. 6 is a block diagram illustrating an exemplary configuration of terminal 200 according to an aspect of the present disclosure. In FIG. 6, terminal 200 may include, for example, receiver 201, reception processor 202, controller 203, reference signal generator 204, transmission processor 205, and transmitter 206.

Receiver 201 may, for example, on a radio signal received via the antenna, perform reception radio processing such as down-conversion and analog-to-digital (A/D) conversion, and output the received signal resulting from the reception radio processing to reception processor 202.

Reception processor 202 may, for example, extract the SRS configuration information included in a received signal input from receiver 201, and output the extracted information to controller 203. Incidentally, in a case where the received signal is an OFDM signal, reception processor 202 may, for example, perform CP removal processing, and Fourier transform (Fast Fourier Transform: FFT) processing.

Controller 203 may, for example, control transmission of an SRS based on the SRS configuration information input from reception processor 202. For example, when detecting an SRS transmission timing from the SRS configuration information, controller 203 identifies, based on the SRS configuration information, an SRS resource set used for transmitting the SRS. Controller 203 may then, for example, extract SRS resource information (including, e.g., transmission bandwidth, number of transmission Combs, and frequency hopping pattern) to be applied to the SRS, based on the identified SRS resource set, and output (or indicate to or configure for) the extracted information to reference signal generator 204 and transmission processor 205. Note that, in the case of Aperiodic SRS transmission, controller 203 may detect the SRS transmission timing, based on the SRS configuration information and the DCI (e.g., trigger information), for example.

Upon receiving an indication for generating a reference signal from controller 203, reference signal generator 204 may, for example, generate the reference signal (e.g., SRS) based on the SRS resource information input from controller 203 and then output the resulting reference signal to transmission processor 205.

Transmission processor 205 may, for example, map the SRS that is input from reference signal generator 204 to the frequency resource indicated from controller 203. Thus, a transmission signal is formed. In a case where the transmission signal is an OFDM signal, transmission processor 205 may, for example, perform the IFFT processing on the signal after the mapping to the frequency resource and then add the CP.

Transmitter 206 may, for example, on the transmission signal formed in transmission processor 205, perform transmission radio processing such as up-conversion and digital-analog (D/A) conversion, and transmit the signal resulting from the transmission radio processing via an antenna.

[Operations of Base Station 100 and Terminal 200]

A description will be given of exemplary operations of base station 100 and terminal 200 having the above-mentioned configurations.

Figure 7:
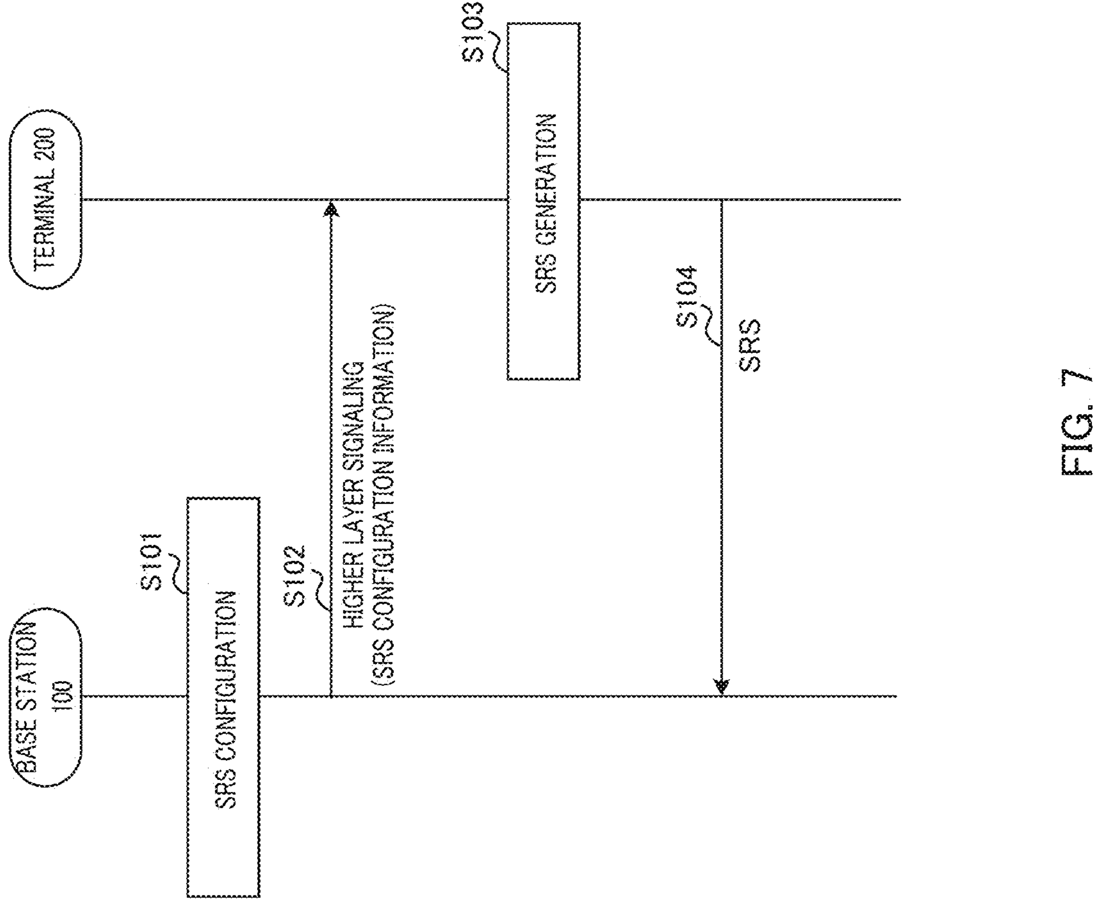
FIG. 7 is a sequence diagram illustrating exemplary operations of the terminal and the base station.

FIG. 7 is a sequence diagram illustrating operation examples of base station 100 and terminal 200.

Base station 100, for example, makes a configuration on an SRS for terminal 200 (S101). In one example, base station 100 may generate SRS configuration information related to the configuration of the SRS.

Base station 100 may, for example, transmit (or configure or indicate) the SRS configuration information to terminal 200 by higher layer signaling (e.g., RRC layer signal) (S102). Incidentally, in the case of Aperiodic SRS transmission, for example, base station 100 may transmit the trigger information to terminal 200 by the DCI (not illustrated).

Terminal 200, for example, generates an SRS based on the SRS configuration information transmitted from base station 100 (S103) and transmits the generated SRS to base station 100 (S104). Base station 100 receives the SRS from terminal 200 based on the SRS configuration information transmitted to terminal 200, for example.

[Configuration Method for SRS Transmission Frequency Band]

A description will be given of an exemplary configuration method, in base station 100 (e.g., controller 101), for a transmission frequency band for an SRS resource included in the SRS configuration information (e.g., SRS resource set).

In the present embodiment, for example, an upper limit value of the number of transmission Combs (i.e., frequency spacing at which SRS is placed) configurable for an SRS in a certain transmission bandwidth (e.g., transmission bandwidth less than threshold value (e.g., four RBs)) may be set smaller than an upper limit value of the number of transmission Combs configurable for an SRS in a transmission bandwidth (e.g., transmission bandwidth greater than threshold value), which is wider than the certain transmission band. That is, in an SRS (e.g., narrowband SRS) placed in a transmission bandwidth less than a certain threshold value (e.g., four RBs), an upper limit value of the number of transmission Combs configurable (or available) per transmission bandwidth may be limited.

FIG. 8 illustrates a configuration example of the number of transmission Combs available for each SRS transmission bandwidth.

In FIG. 8, for example, in an SRS with an SRS transmission bandwidth of four RBs or more, any of the number of transmission Combs=2, 4, and 8 is available (e.g., upper limit value of number of transmission Combs: 8).

On the other hand, in FIG. 8, for example, in SRS an SRS with an SRS transmission bandwidth less than four RBs, an upper limit value of the available number of transmission Combs may be set small (i.e., limited) as compared to the SRS with the SRS transmission bandwidth of four RBs or more. For example, an upper limit value of the available number of transmission Combs for the SRS with the SRS transmission bandwidth less than four RBs may be set according to an SRS transmission bandwidth.

For example, in FIG. 8, in a case where an SRS transmission bandwidth is two RBs, any of the number of transmission Combs=2 and 4 is available (e.g., upper limit value of number of transmission Combs: 4). Further, for example, in FIG. 8, in a case where an SRS transmission bandwidth is one RB, the number of transmission Combs=2 is available (e.g., upper limit value of number of transmission Combs: 2). For example, as in FIG. 8, the narrower an SRS transmission bandwidth is, the smaller an upper limit value of the available number of transmission Combs may be.

In one example, as illustrated in FIG. 2 or Equation 1, in an SRS with each SRS transmission bandwidth, the greater the number of transmission Combs is, the shorter a sequence length of a sequence for SRS generation is. Therefore, as illustrated in FIG. 8, for example, the narrower an SRS transmission bandwidth is, the smaller an upper limit value of the available number of transmission Combs is set, thereby suppressing a decrease in a lower limit value of the sequence length of the sequence for SRS generation. Consequently, for example, even when an SRS transmission bandwidth is less than a threshold value, it is possible to prevent a sequence length from being shorter than a certain threshold value. In other words, even when the SRS transmission bandwidth is less than the threshold value, a lower limit value of the sequence length can be maintained to be equal to or greater than a certain threshold value.

FIG. 9 illustrates an example of a relation between an SRS transmission bandwidth, the number of transmission Combs, and a sequence length. In FIG. 9, by way of example, a relation between the SRS transmission bandwidth and the number of transmission Combs may be similar to that illustrated in FIG. 8. As illustrated in FIG. 9, a lower limit value of a sequence length for SRS generation corresponding to an SRS with an SRS transmission bandwidth less than a threshold value (e.g., four RBs), such as two RBs or one RB, is 6 [sc]. In other words, in FIG. 9, even in the SRS with the SRS transmission bandwidth such as two RBs or one RB, which is less than the threshold value (e.g., four RBs), it is possible to maintain a lower limit value (e.g., 6 [sc]) of a sequence length for SRS generation similar to an SRS with an SRS transmission bandwidth such as four RBs, which is equal to or greater than the threshold value.

This makes it possible to, for example, suppress an increase in cross-correlation (or interference) between SRSs caused by a sequence length of a sequence for SRS generation (i.e., number of sequences that can be generated), thereby suppressing deterioration of the channel estimation accuracy with the SRS. In other words, for example, maintaining a lower limit value of the sequence length to be equal to or greater than a certain threshold value allows generating more sequences having favorable PAPR characteristics or cross-correlation characteristics. Hence, according to the present embodiment, increasing the number of transmission Combs for an SRS makes it possible to suppress the reduction in the channel estimation accuracy using the SRS and increase the transmission power density for the SRS, thereby improving the coverage performance of the SRS.

Incidentally, in the present embodiment, in FIGS. 8 and 9, an example has been described in which the lower limit value of the sequence length for SRS generation is set to 6 [se], but the lower limit value of the sequence length is not limited to 6 [sc]. For example, an upper limit value of the number of transmission Combs is not limited to the values indicated in FIG. 8 or FIG. 9. FIGS. 10 and 11 each illustrates another example of the relation between the SRS transmission bandwidth, the number of transmission Combs, and the sequence length. In FIG. 10, for example, to an SRS with an SRS transmission bandwidth less than four RBs, an upper limit value of the available number of transmission Combs may be set to be smaller as compared to the case of FIG. 8. Thus, for example, as illustrated in FIG. 11, a lower limit value of a sequence length for SRS generation is set (i.e., maintained) to be 12 [sc], which is great as compared to the case of FIG. 9. As a result, in FIGS. 10 and 11, for example, it is easy to use an SRS with a long sequence length as compared with the cases of FIGS. 8 and 9, and thus, the channel estimation accuracy with the SRS can be improved.

Further, in the present embodiment, in FIGS. 8 to 10, a case has been described where the number of subcarriers per RB of Equation 1 is 12 (N°cRB=12), but the number of subcarriers per RB is not limited to 12 [sc/RB]. In one example, in a case where the number of subcarriers per RB is 6 [sc/RB], a sequence length becomes ½ with respect to the sequence lengths illustrated in FIGS. 9 and 11, and an upper limit value of the available number of transmission Combs is reduced by half with respect to those in FIGS. 8 and 10.

Embodiment 2

In the present embodiment, a description will be given of an example of SRS (e.g., narrowband SRS) frequency hopping placed in a transmission bandwidth less than a certain threshold value (e.g., four RBs).

[Frequency Hopping for Narrowband SRS]

As mentioned above, the smallest transmission bandwidth for a NR SRS may be four RBs, and a transmission bandwidth for an SRS may be a multiple of four, for example. In addition, N-time frequency hopping (N is integer) for the narrowband SRS allows the narrowband SRS to be transmitted in a Sounding band which is N times the transmission bandwidth.

For example, in future NR, supporting an SRS with a transmission bandwidth less than four RBs (e.g., two RBs or one RB) may also be assumed. In this case, for example, application of a frequency hopping pattern of two-RB or one-RB granularity may cause a collision of SRSs with a frequency hopping pattern of four-RB granularity.

Figure 12:
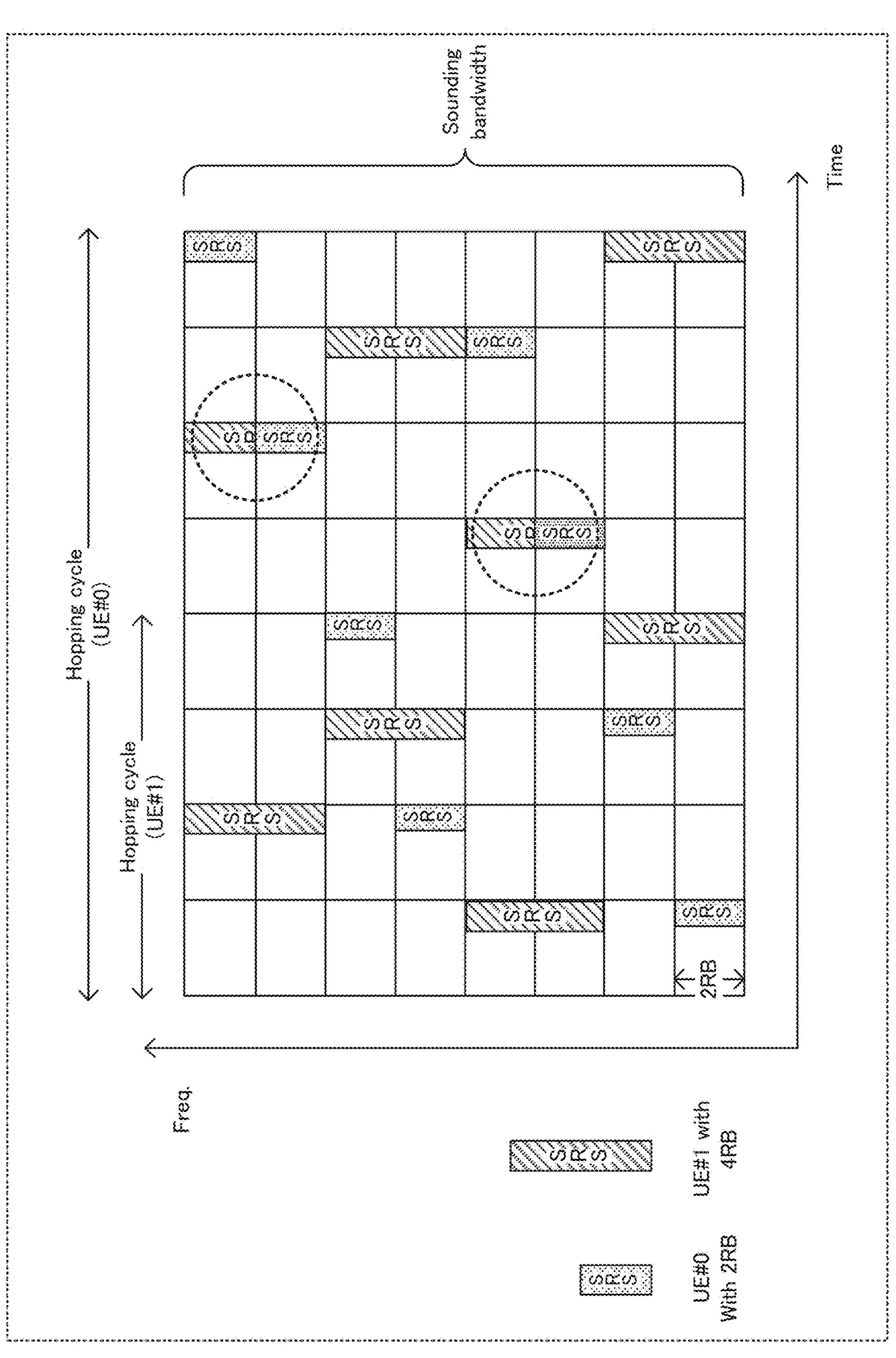
FIG. 12 illustrates an example of SRS frequency hopping.

FIG. 12 illustrates examples of frequency hopping patterns. In FIG. 12, as an example, a frequency hopping pattern of two-RB granularity (i.e., in units of two RBs) is configured for an SRS transmitted by UE #0, and a frequency hopping pattern of four-RB granularity (i.e., in units of four-RBs) is configured for an SRS transmitted by UE #1. In FIG. 12, for example, a collision of SRSs transmitted from each of UE #0 and UE #1 may occur at least some of SRS transmit timings of each of UE #0 and UE #1.

The collision of SRSs may generate interference between SRSs, which may result in deterioration of the channel estimation accuracy with the SRS.

Therefore, in the present embodiment, a description will be given of a configuration example of a frequency hopping pattern for a narrowband SRS.

As to the configuration examples of a base station and a terminal according to the present Embodiment, for example, some functions may be different from Embodiment 1 while other functions may be the same as in Embodiment 1.

[Configuration of Base Station]

In base station 100 according to the present embodiment, controller 101 may, for example, configure a frequency hopping pattern for an SRS placed in each transmission bandwidth. By way of example, controller 101 may configure a frequency hopping pattern in which frequency resources do not collide between a frequency hopping pattern applied to an SRS with a transmission bandwidth less than a threshold value (e.g., narrowband SRS) and a frequency hopping pattern applied to an SRS with a transmission bandwidth equal to or greater than the threshold value (e.g., narrowband SRS). Controller 101 may, for example, output SRS configuration information including the configured frequency hopping pattern to encoder/modulator 102 and reception processor 106.

Reception processor 106 may, for example, identify a resource to which the SRS is mapped, based on the SRS configuration information (including, e.g., frequency hopping pattern) input from controller 101, and extract a signal component mapped to the identified resource from the received signal input from receiver 105.

Other processing in base station 100 may be the same as in Embodiment 1.

[Configuration of Terminal]

Terminal 200 according to the present embodiment may, for example, map an SRS to the resource indicated for SRS transmission and transmit the SRS, based on the SRS configuration information (including, e.g., frequency hopping pattern) from base station 100.

[Configuration Examples of Frequency Hopping Pattern for Narrowband SRS]

A description will be given of a configuration example of a frequency hopping pattern to be applied to an SRS resource included in SRS configuration information (e.g., SRS resource set) generated in base station 100 (e.g., controller 101).

In the present embodiment, for example, in a frequency hopping pattern for a narrowband SRS placed in a transmission bandwidth less than a threshold value (e.g., four RBs), an SRS may be transmitted in a portion of the transmission band configured by a frequency hopping pattern for an SRS placed in a transmission bandwidth of the threshold value (e.g., four RBs).

For example, base station 100 and terminal 200 may control the SRS frequency hopping with the transmission bandwidth less than the threshold value in units of transmission bands in each of which the SRS with the transmission bandwidth of the threshold value is placed for each slot (e.g., in units of four RBs).

Hereinafter, Example 1 and Example 2 of frequency hopping pattern configurations will be described.

Example 1

Figure 13:
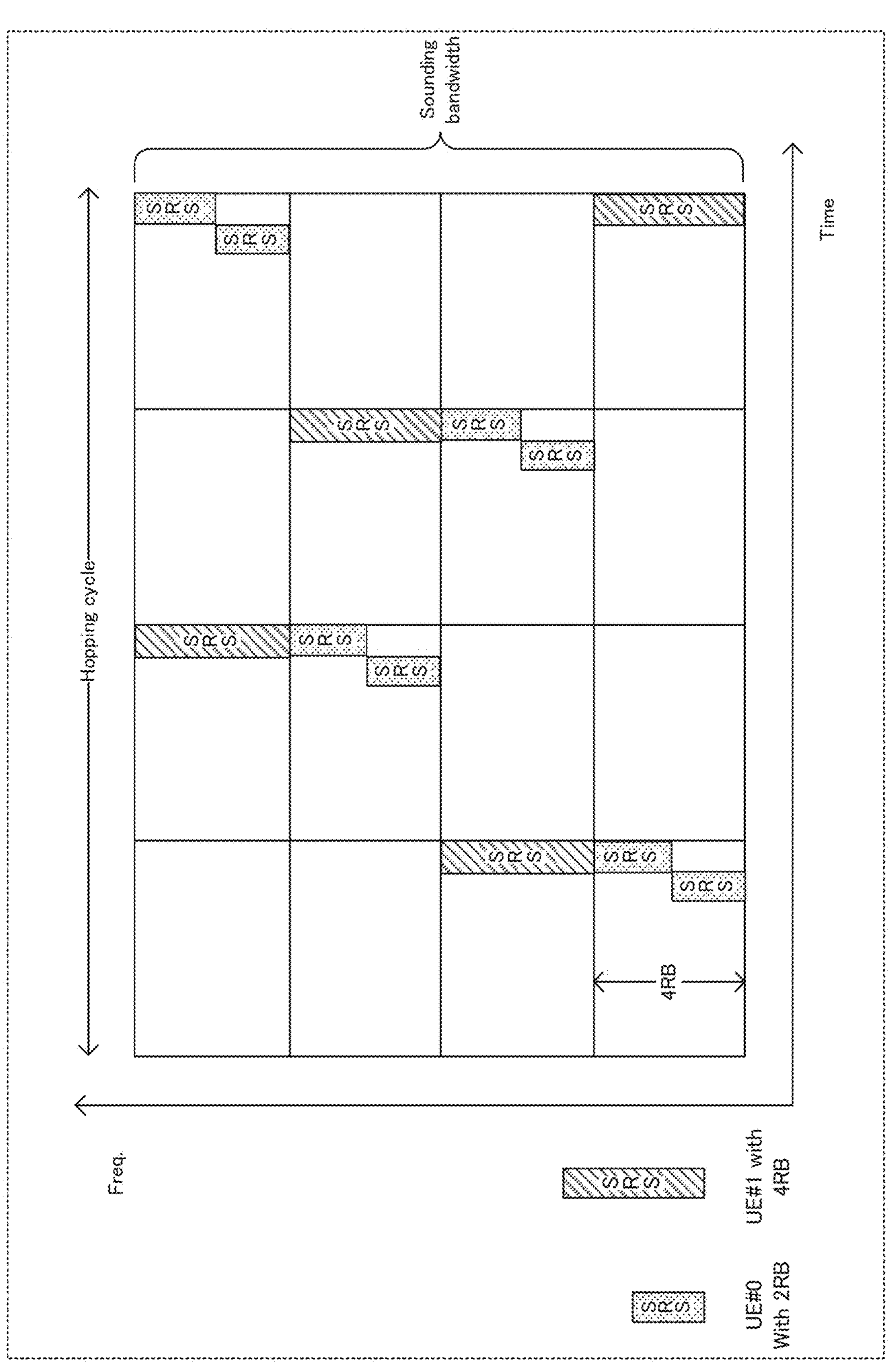
FIG. 13 illustrates an example of SRS frequency hopping according to Embodiment 2.
Figure 14:
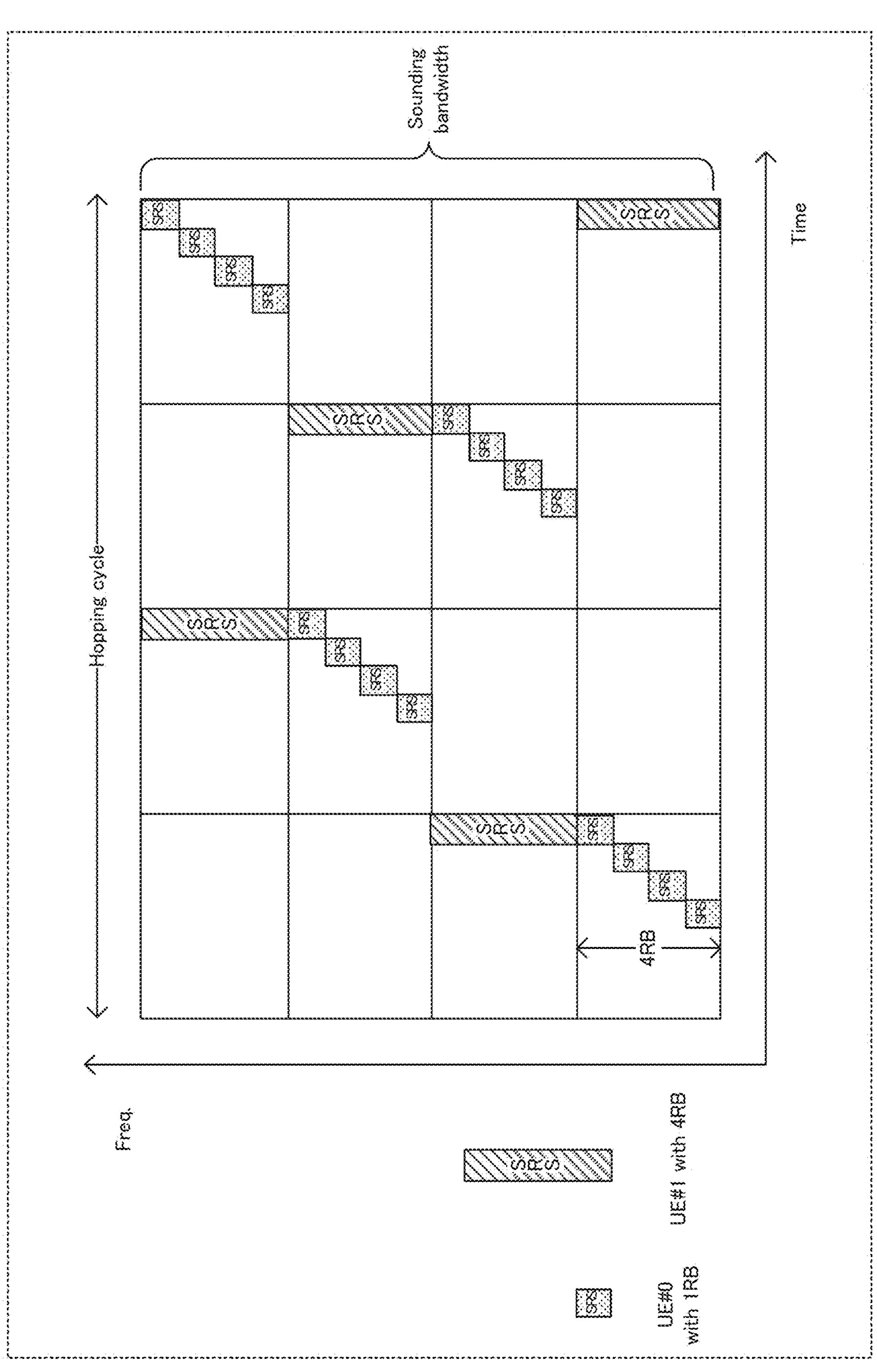
FIG. 14 illustrates another example of the SRS frequency hopping according to Embodiment 2.

FIGS. 13 and 14 illustrate configuration examples of frequency hopping patterns for narrowband SRSs.

In FIGS. 13 and 14, base station 100 and terminal 200 may, for example, control frequency hopping (e.g., frequency hopping between slots) for a narrowband SRS (e.g., SRS of UE #0) with a transmission band less than a threshold value (e.g., four RBs), in units of transmission bands each for an SRS that is to be placed in a transmission bandwidth corresponding to the threshold value.

Moreover, in FIGS. 13 and 14, base station 100 and terminal 200 may, for example, control frequency hopping between a plurality of SRS symbols in each of which an SRS is placed in a slot, in a frequency hopping pattern (e.g., frequency hopping pattern configured for UE #0) for the narrowband SRS with the transmission bandwidth less than a threshold value (e.g., four RBs).

For example, in FIG. 13, a frequency hopping pattern of two-RB granularity (i.e., transmission bandwidth is less than threshold value) is configured for an SRS transmitted by UE #0, and a frequency hopping pattern of four-RB granularity (i.e., transmission bandwidth is equal to or greater than threshold value) is configured for an SRS transmitted by UE #1. In FIG. 13, for example, narrowband SRSs of two RBs may be arranged in two symbols in each slot and frequency-hopped in a four-RB band in the slots. Further, as illustrated in FIG. 13, the SRSs arranged in two symbols in each slot may be frequency-hopped between slots in units of four RBs.

For example, in FIG. 14, a frequency hopping pattern of one-RB granularity (i.e., transmission bandwidth is less than threshold value) is configured for an SRS transmitted by UE #0, and a frequency hopping pattern of four-RB granularity (i.e., transmission bandwidth is equal to or greater than threshold value) is configured for an SRS transmitted by UE #1. In FIG. 14, for example, narrowband SRSs of one RB may be arranged in four symbols in each slot and frequency-hopped in a four-RB band in the slots. Further, as illustrated in FIG. 14, the SRSs arranged in four symbols in each slot may be frequency-hopped between slots in units of four RBs.

In FIGS. 13 and 14, the four-RB band (i.e., hopping unit of frequency hopping between slots) in which the frequency hopping in a slot is performed may be, for example, one of bands determined based on a frequency hopping pattern for an NR SRS (or SRS with transmission bandwidth corresponding to threshold value). For example, as illustrated in FIGS. 13 and 14, a total amount (e.g., four RBs) of transmission bandwidths in which each of a plurality of SRSs that are frequency-hopped between symbols in a slot in UE #0 is placed is identical to a transmission bandwidth (e.g., four RBs) of an SRS placed in each slot in UE #1. Further, as illustrated in FIGS. 13 and 14, in each slot, the transmission band in which an SRS of UE #0 is placed may be different from the transmission band in which an SRS of UE #1 is placed.

With this configuration of the frequency hopping patterns, for example, a frequency hopping pattern for a narrowband SRS with a transmission bandwidth less than a threshold value (e.g., four RBs) and a frequency hopping pattern for a narrowband SRS with a transmission bandwidth equal to or greater than the threshold value (e.g., four RBs) are orthogonally multiplexed in the frequency domain. Therefore, even when frequency hopping patterns of different granularities are applied to different terminals 200, an occurrence of a collision of SRSs can be suppressed.

Further, for example, the frequency hopping is applied between the symbols in a slot to the narrowband SRS with the transmission bandwidth less than a threshold value (e.g., four RBs), so that the hopping period (or frequency hopping cycle) can be reduced. For example, in FIGS. 13 and 14, a hopping period for the SRS with the transmission bandwidth less than a threshold value is four slots.

In FIGS. 13 and 14, as an example, a case has been described where, in the frequency hopping between symbols in a slot, a pattern is configured in which an SRS in a later symbol in the time domain is placed in a higher band in the frequency domain, but the frequency hopping between symbols in a slot is not limited to this case.

Example 2

Figure 15:
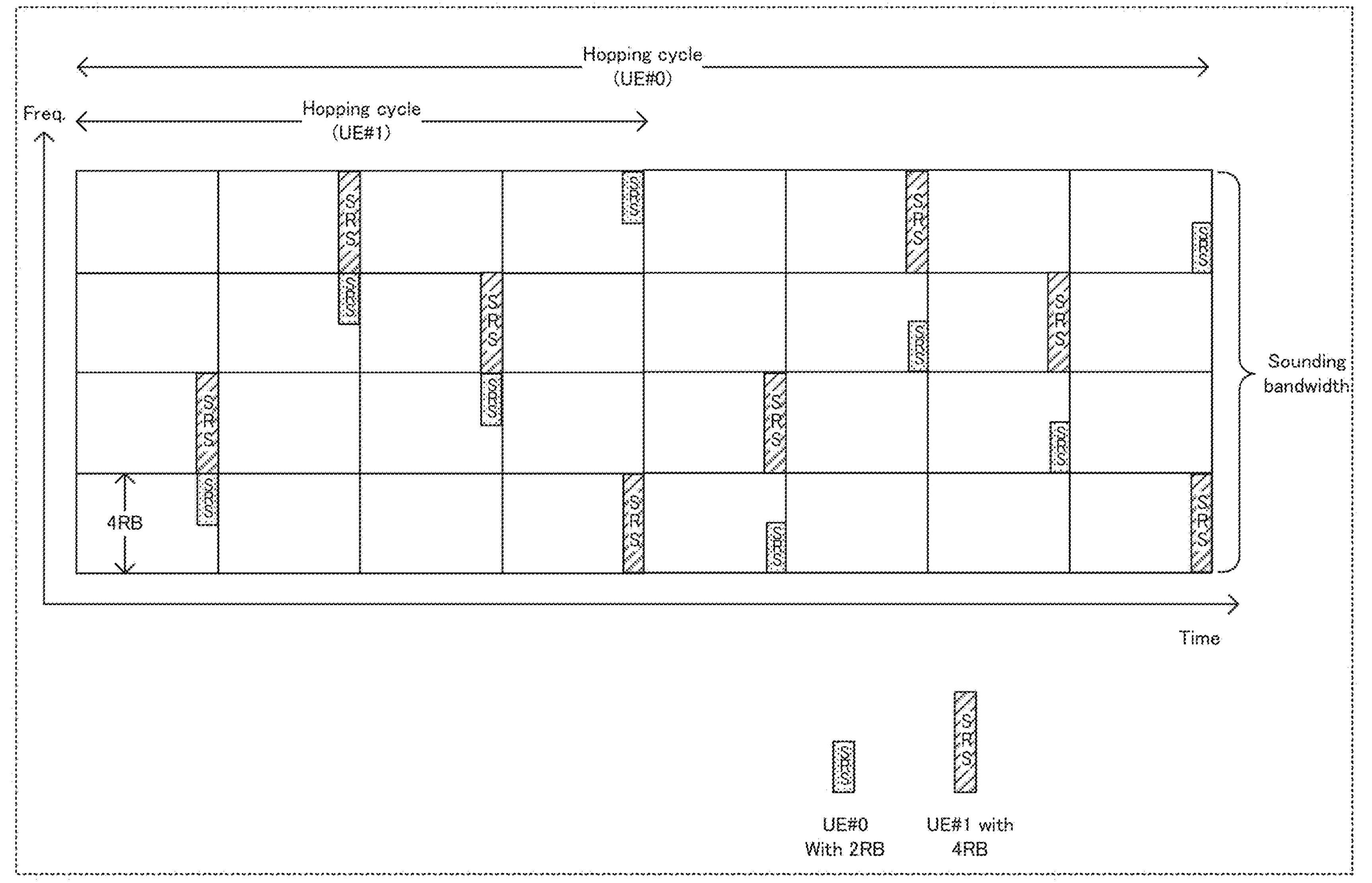
FIG. 15 illustrates still another example of the SRS frequency hopping according to Embodiment 2.

FIG. 15 illustrates another configuration example of a frequency hopping pattern for narrowband SRSs.

In FIG. 15, base station 100 and terminal 200, for example, control frequency hopping for a narrowband SRS (e.g., SRS of UE #0) with a transmission bandwidth less than a threshold value (e.g., four RBs), at every frequency hopping period (e.g., at every slot) for an SRS with a transmission bandwidth corresponding to the threshold value (e.g., four RBs).

Further, as illustrated in FIG. 15, in a frequency hopping pattern for the narrowband SRS with the transmission bandwidth less than the threshold value (e.g., four RBs) (e.g., frequency hopping pattern for UE #0), an SRS may be frequency-hopped in units of transmission bands (e.g., in units of four RBs) each for an SRS (e.g., SRS of UE #1) with a transmission bandwidth corresponding to the threshold value.

For example, in FIG. 15, a frequency hopping pattern of two-RB granularity (i.e., transmission bandwidth is less than threshold value) is configured for an SRS transmitted by UE #0, and a frequency hopping pattern of four-RB granularity (i.e., transmission bandwidth is equal to or greater than threshold value) is configured for an SRS transmitted by UE #1. In FIG. 15, for example, narrowband SRSs of two RBs may be arranged in one symbol in slots and frequency-hopped between the slots in units of four RBs (e.g., in transmission band unit similar to that for SRSs of UE #1).

As illustrated in FIG. 15, a hopping period (or frequency hopping cycle) for the narrowband SRS of two RBs is eight slots.

Incidentally, for example, a frequency hopping pattern may be similarly configured for an SRS with a transmission bandwidth of one RB (not illustrated). The hopping period of the narrowband SRS of one-RB is, for example, 16 slots.

In FIG. 15, the four-RB band (i.e., hopping unit of frequency hopping between slots) in which the SRS frequency hopping with a transmission bandwidth less than a threshold value is performed may be, for example, one of bands determined based on a frequency hopping pattern for an NR SRS (or SRS with transmission bandwidth corresponding to threshold value). For example, as illustrated in FIG. 15, in each slot, the transmission band in which an SRS of UE #0 is placed may be different from the transmission band in which an SRS of UE #1 is placed.

With this configuration of the frequency hopping patterns, for example, a frequency hopping pattern for a narrowband SRS with a transmission bandwidth less than a threshold value (e.g., four RBs) and a frequency hopping pattern for a narrowband SRS with a transmission bandwidth equal to or greater than the threshold value (e.g., four RBs) are orthogonally multiplexed in the frequency domain. Therefore, even when frequency hopping patterns of different granularities are applied to different terminals 200, an occurrence of a collision between SRSs can be suppressed.

For example, Example 1 and Example 2 are compared with each other.

In Example 1, as compared to Example 2, the hopping period for an SRS with a transmission bandwidth less than a threshold value can be configured shorter. That is, in Example 1, for example, it is possible to maintain the hopping period similar to a hopping period for an SRS with a transmission bandwidth equal to or greater than the threshold value.

On the other hand, in Example 2, as compared to Example 1, a resource amount of the SRSs placed in each slot can be reduced.

The configuration examples of the frequency-hopping patterns for narrowband SRSs have been each described, thus far.

In the present embodiment, in the frequency hopping pattern for the narrowband SRS with the transmission bandwidth less than a threshold value (e.g., four RBs), an SRS is transmitted in at least a portion of the transmission bands configured by the frequency hopping pattern for the SRS with the transmission bandwidth corresponding to the threshold value (e.g., four RBs). In other words, the frequency hopping pattern for the narrowband SRS less than a threshold value may reuse the configuration (i.e., mechanism, for example, hopping unit) of the frequency hopping pattern for the SRS with the transmission bandwidth corresponding the threshold value.

Thus, in the present embodiment, in the frequency hopping pattern for the narrowband SRS with the transmission bandwidth less than a threshold value and the frequency hopping pattern for the narrowband SRS with the transmission bandwidth equal to or greater than the threshold value, SRSs can be orthogonally multiplexed in the frequency domain, thereby suppressing an occurrence of a collision of SRSs. Therefore, according to the present embodiment, it is possible to suppress interference between SRSs and improve the channel estimation accuracy with the SRS.

Exemplary embodiments of the present disclosure have been each described, thus far.

Incidentally, in an exemplary embodiment of the present disclosure, a case has been described where the SRS configuration information is configured for terminal 200 by higher layer signaling (e.g., RRC layer signaling), but the configuration of the SRS configuration information is not limited to the configuration by the higher layer signaling and may be by other signaling (e.g., physical layer signaling).

Further, in an exemplary embodiment of the present disclosure, an object to which a resource such as a transmission bandwidth or the number of transmission Combs is not limited to a reference signal such as an SRS and may be other signals (or information). In one example, an exemplary embodiment of the present disclosure may be applied to, instead of the SRS, a response signal (e.g., also referred to as ACK/NACK or HARQ-ACK) to data.

Further, in an exemplary embodiment of the present disclosure, a parameter such as a candidate for an SRS resource (e.g., combination of transmission bandwidth, number of transmission Combs, and sequence length), a threshold value (e.g., four RBs), an upper limit value of the number of transmission Combs, granularity of the frequency hopping (e.g., one RB, two RBs, or four RBs), or the number of subcarriers per RB is not limited to the above-mentioned examples and may be other values, for example.

(Control Signal)

In an exemplary embodiment of the present disclosure, the downlink control signal (or downlink control information) may be, for example, a signal (or information) transmitted at a Physical Downlink Control Channel (PDCCH) in the physical layer, or a signal (or information) transmitted at Medium Access Control (MAC) or Radio Resource Control (RRC) in the higher layer. In addition, the signal (or information) is not limited to a case of being indicated by the downlink control signal and may be previously specified by the specifications (or standards) or may be previously configured in a base station and a terminal.

In an exemplary embodiment of the present disclosure, the uplink control signal (or uplink control information) may be, for example, a signal (or information) transmitted in a PDCCH in the physical layer, or a signal (or information) transmitted in MAC or RRC in the higher layer. In addition, the signal (or information) is not limited to a case of being indicated by the uplink control signal and may be previously specified by the specifications (or standards) or may be previously configured in a base station and a terminal. Further, the uplink control signal may be replaced with, for example, uplink control information (UCI), 1st stage sidelink control information (SCI), or 2nd stage SCI.

(Base Station)

In an exemplary embodiment of the present disclosure, the base station may be a transmission reception point (TRP), a clusterhead, an access point, a remote radio head (RRH), an eNodeB (eNB), a gNodeB (gNB), a base station (BS), a base transceiver station (BTS), a base unit, or a gateway, for example. In addition, in sidelink communication, a terminal may be adopted instead of a base station. Further, instead of a base station, a relay apparatus may be adopted for relaying the communication between a higher node and a terminal.

(Uplink/Downlink/Sidelink)

An exemplary embodiment of the present disclosure may be applied to, for example, any of the uplink, downlink, and sidelink. In one example, an exemplary embodiment of the present disclosure may be applied to a Physical Uplink Shared Channel (PUSCH), a Physical Uplink Control Channel (PUCCH), and a Physical Random Access Channel (PRACH) in uplink, a Physical Downlink Shared Channel (PDSCH), a PDCCH, and a Physical Broadcast Channel (PBCH) in downlink, or a Physical Sidelink Shared Channel (PSSCH), a Physical Sidelink Control Channel (PSCCH), and a Physical Sidelink Broadcast Channel (PSBCH) in sidelink.

The PDCCH, the PDSCH, the PUSCH, and the PUCCH are examples of a downlink control channel, a downlink data channel, an uplink data channel, and an uplink control channel, respectively. Further, the PSCCH and the PSSCH are examples of a side link control channel and a side link data channel, respectively. Further, the PBCH and the PSBCH are examples of a broadcast channel, and the PRACH is an example of a random access channel.

(Data Channel/Control Channel)

An exemplary embodiment of the present disclosure may be applied to, for example, any of a data channel and a control channel. In one example, a channel in an exemplary embodiment of the present disclosure may be replaced with any of a PDSCH, a PUSCH, and a PSSCH for the data channel, or a PDCCH, a PUCCH, a PBCH, a PSCCH, and a PSBCH for the control channel.

(Reference Signal)

In an exemplary embodiment of the present disclosure, the reference signals are signals known to both a base station and a mobile station and each reference signal may be referred to as a reference signal (RS) or sometimes a pilot signal. Each reference signal may be any of: a Demodulation Reference Signal (DMRS); a Channel State Information-Reference Signal (CSI-RS); a Tracking Reference Signal (TRS); a Phase Tracking Reference Signal (PTRS); a Cell-specific Reference Signal (CRS); or a Sounding Reference Signal (SRS).

(Time Interval)

In an exemplary embodiment of the present disclosure, time resource units are not limited to one or a combination of slots and symbols and may be time resource units, such as frames, superframes, subframes, slots, time slot subslots, minislots, or time resource units, such as symbols, orthogonal frequency division multiplexing (OFDM) symbols, single carrier-frequency division multiplexing access (SC-FDMA) symbols, or other time resource units. The number of symbols included in one slot is not limited to any number of symbols exemplified in the embodiments described above and may be other numbers of symbols.

(Frequency Band)

An exemplary embodiment of the present disclosure may be applied to either of a licensed band or an unlicensed band.

(Communication)

An exemplary embodiment of the present disclosure may be applied to any of the communication between a base station and a terminal, the communication between terminals (Sidelink communication, Uu link communication), and the communication for Vehicle to Everything (V2X). In one example, a channel in an exemplary embodiment of the present disclosure may be replaced with any of a PSCCH, a PSSCH, a Physical Sidelink Feedback Channel (PSFCH), a PSBCH, a PDCCH, a PUCCH, a PDSCH, a PUSCH, and a PBCH.

Further, an exemplary embodiment of the present disclosure may be applied to either of terrestrial networks or a non-terrestrial network (NTN) such as communication using a satellite or a high-altitude pseudolite (High Altitude Pseudo Satellite (HAPS)). Further, an exemplary embodiment of the present disclosure may be applied to a terrestrial network having a large transmission delay compared to the symbol length or slot length, such as a network with a large cell size and/or an ultra-wideband transmission network.

(Antenna Port)

In an exemplary embodiment of the present disclosure, the antenna port refers to a logical antenna (antenna group) configured of one or more physical antennae. For example, the antenna port does not necessarily refer to one physical antenna and may refer to an array antenna or the like configured of a plurality of antennae. In one example, the number of physical antennae configuring the antenna port may not be specified, and the antenna port may be specified as the minimum unit with which a terminal station can transmit a Reference signal. Moreover, the antenna port may be specified as the minimum unit for multiplying a weight of a Precoding vector.

<5G NR System Architecture and Protocol Stack>

3GPP has been working on the next release for the 5th generation cellular technology (simply called "5G"), including the development of a new radio access technology (NR) operating in frequencies ranging up to 100 GHz. The first version of the 5G standard was completed at the end of 2017, which allows proceeding to 5G NR standard-compliant trials and commercial deployments of terminals (e.g., smartphones).

Figure 16:
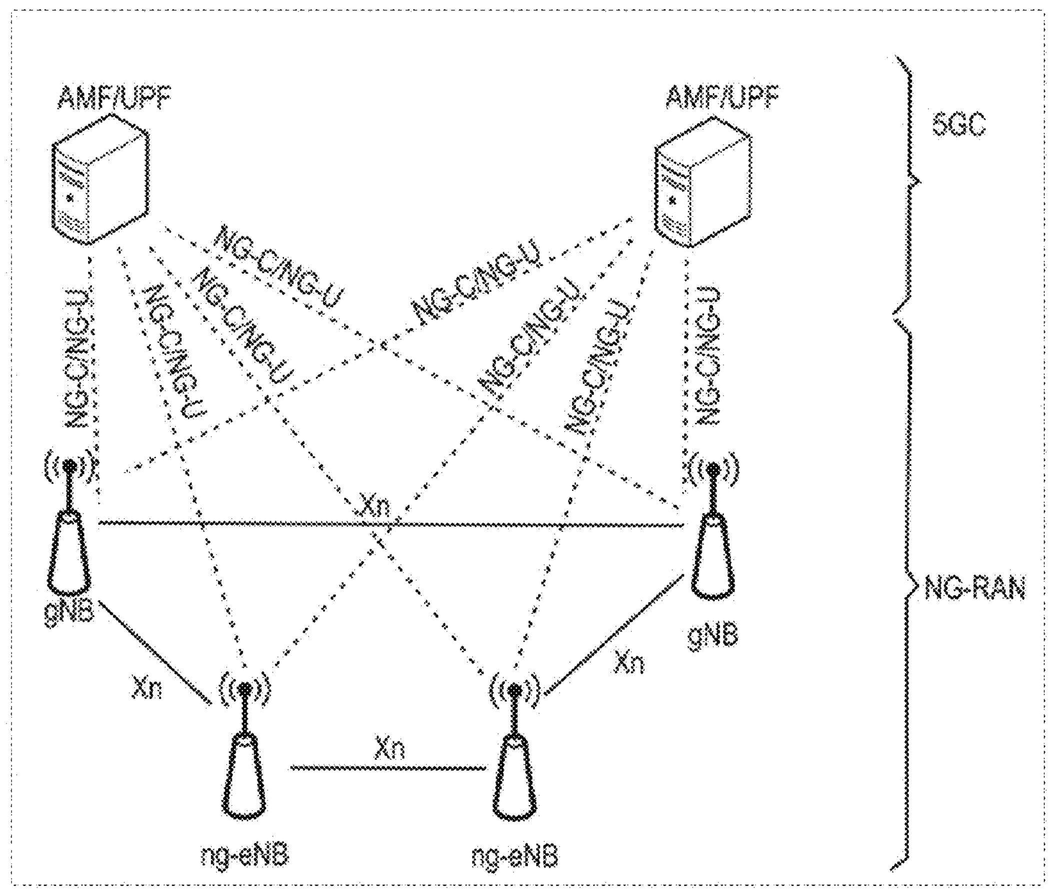
FIG. 16 illustrates an exemplary architecture of a 3GPP NR system.

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 16 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see clause 6.4 of TS 38.300), RLC (Radio Link Control, see clause 6.3 of TS 38.300) and MAC (Medium Access Control, see clause 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., clause 6.5 of 3GPP TS 38.300). A control plane protocol stack is also defined for NR (see for instance TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For instance, the Medium Access Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates on the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km2 in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz . . . are being considered at the moment. The symbol duration Tu and the subcarrier spacing Δf are directly related through the formula Δf=1/Tu. In a similar manner as in LTE systems, the term “resource element” can be used to denote a minimum resource unit being composed of one subcarrier for the length of one OFDM/SC-FDMA symbol.

In the new radio system 5G-NR for each numerology and each carrier, resource grids of subcarriers and OFDM symbols are defined respectively for uplink and downlink. Each element in the resource grids is called a resource element and is identified based on the frequency index in the frequency domain and the symbol position in the time domain (see 3GPP TS 38.211 v15.6.0).

<Functional Split Between NG-RAN and 5GC in 5G NR>

Figure 17:
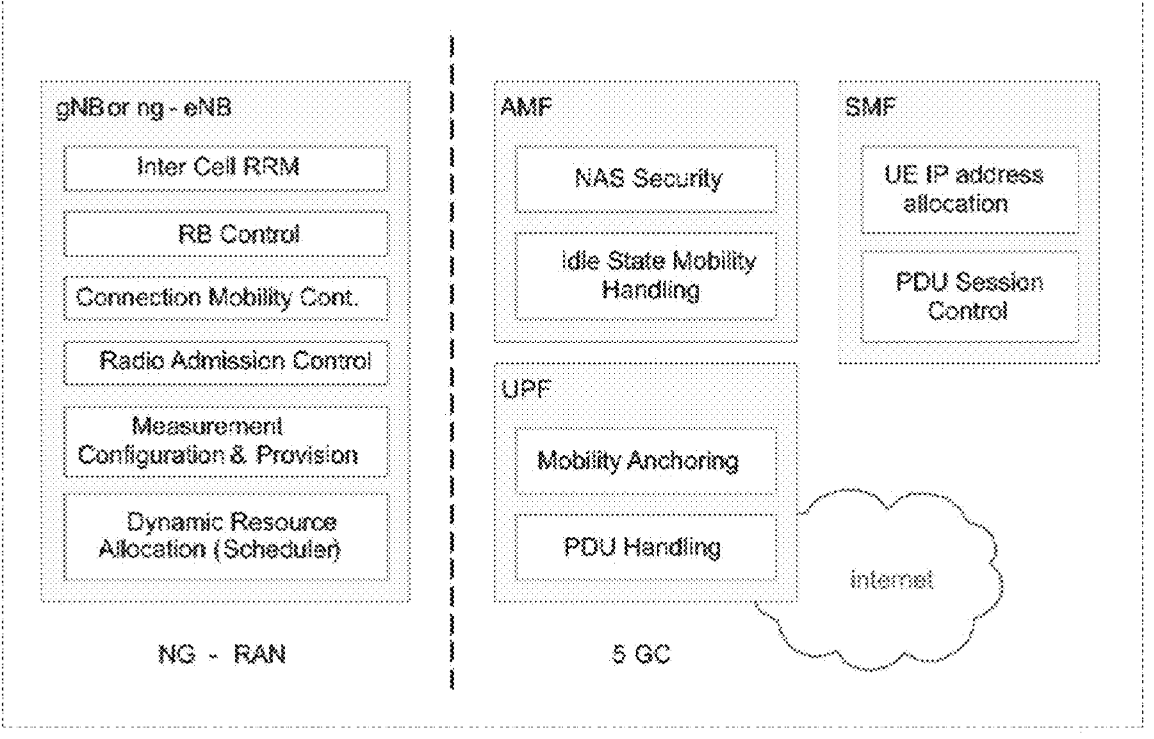
FIG. 17 schematically illustrates a functional split between Next Generation-Radio Access Network (NG-RAN) and 5th Generation Core (5GC)

FIG. 17 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

- Radio Resource Management functions such as Radio Bearer Control, Radio Admission Control, Connection Mobility Control, and dynamic allocation (scheduling) of both uplink and downlink resources to a UE;
- IP header compression, encryption, and integrity protection of data;
- Selection of an AMF during UE attachment in such a case when no routing to an AMF can be determined from the information provided by the UE;
- Routing user plane data towards the UPF;
- Routing control plane information towards the AMF;
- Connection setup and release;
- Scheduling and transmission of paging messages;
- Scheduling and transmission of system broadcast information (originated from the AMF or an operation management maintenance function (OAM: Operation, Admission, Maintenance));
- Measurement and measurement reporting configuration for mobility and scheduling;
- Transport level packet marking in the uplink;
- Session management;
- Support of network slicing;
- QoS flow management and mapping to data radio bearers;
- Support of UEs in the RRC INACTIVE state;
- Distribution function for NAS messages;
- Radio access network sharing;
- Dual connectivity; and
- Tight interworking between NR and E-UTRA.

The Access and Mobility Management Function (AMF) hosts the following main functions:

- Function of Non-Access Stratum (NAS) signaling termination;
- NAS signaling security;
- Access Stratum (AS) security control;
- Inter-Core Network (CN) node signaling for mobility between 3GPP access networks;
- Idle mode UE reachability (including control and execution of paging retransmission);
- Registration area management;
- Support of intra-system and inter-system mobility;
- Access authentication;
- Access authorization including check of roaming rights;
- Mobility management control (subscription and policies);
- Support of network slicing; and
- Session Management Function (SMF) selection.

In addition, the User Plane Function (UPF) hosts the following main functions:

- Anchor Point for intra-/inter-RAT mobility (when applicable);
- External Protocol Data Unit (PDU) session point for interconnection to a data network;
- Packet routing and forwarding;
- Packet inspection and a user plane part of Policy rule enforcement;
- Traffic usage reporting;
- Uplink classifier to support routing traffic flows to a data network;
- Branching point to support multi-homed PDU session;
- QoS handling for user plane (e.g., packet filtering, gating, UL/DL rate enforcement);
- Uplink traffic verification (SDF to QoS flow mapping); and
- Function of downlink packet buffering and downlink data notification triggering.

Finally, the Session Management Function (SMF) hosts the following main functions:

- Session management;
- UE IP address allocation and management;
- Selection and control of UPF;
- Configuration function for traffic steering at the User Plane Function (UPF) to route traffic to a proper destination;

Control part of policy enforcement and QoS; and

Downlink data notification.

<RRC Connection Setup and Reconfiguration Procedure>

Figure 18:
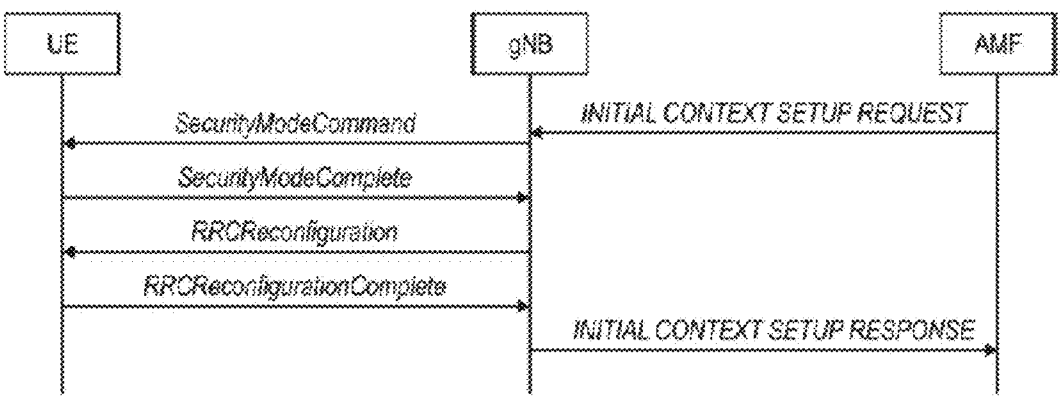
FIG. 18 is a sequence diagram of a Radio Resource Control (RRC) connection setup/reconfiguration procedure.

FIG. 18 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2 (SRB2) and Data Radio Bearer(s) (DRB(s)) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB notifies the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which in operation, transmits an initial context setup message to the gNodeB via the NG connection such that a signaling radio bearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 19:
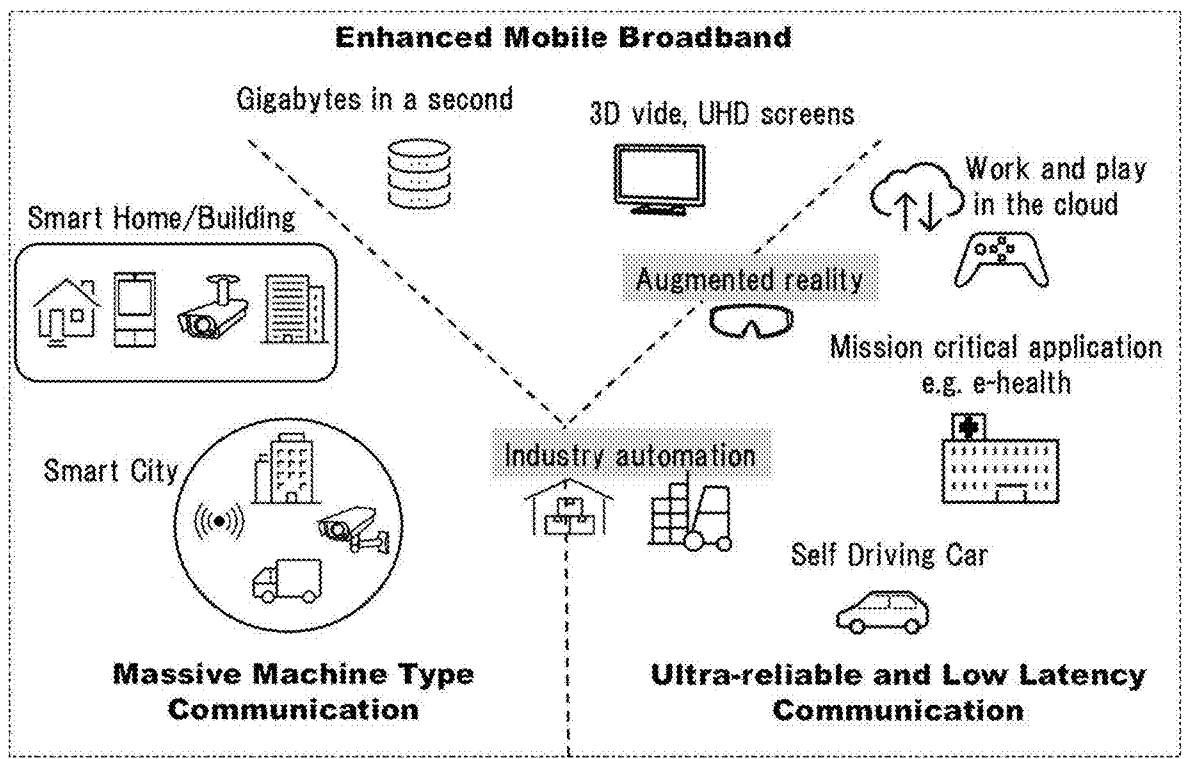
FIG. 19 schematically illustrates usage scenarios of enhanced Mobile broadband (eMBB), massive Machine Type Communications (mMTC), and Ultra Reliable and Low Latency Communications (URLLC)

FIG. 19 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile broadband (eMBB) has been concluded. In addition to further extending the eMBB support, the current and future work would involve the standardization for ultra-reliable and low-latency communications (URLLC) and massive machine-type communications (mMTC). FIG. 19 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a block error rate (BLER) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, or the like. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been envisioned such as factory automation, transport industry and electrical power distribution. The tighter requirements are higher reliability (up to 10-6 level), higher availability, packet sizes of up to 256 bytes, time synchronization up to the extent of a few μs (where the value can be one or a few us depending on frequency range and short latency on the order of 0.5 to 1 ms (in particular a target user plane latency of 0.5 ms), depending on the use cases).

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU sessions. For each UE, the NG-RAN establishes at least one Data Radio Bearer (DRB) together with the PDU session, e.g., as illustrated above with reference to FIG. 18. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 20:
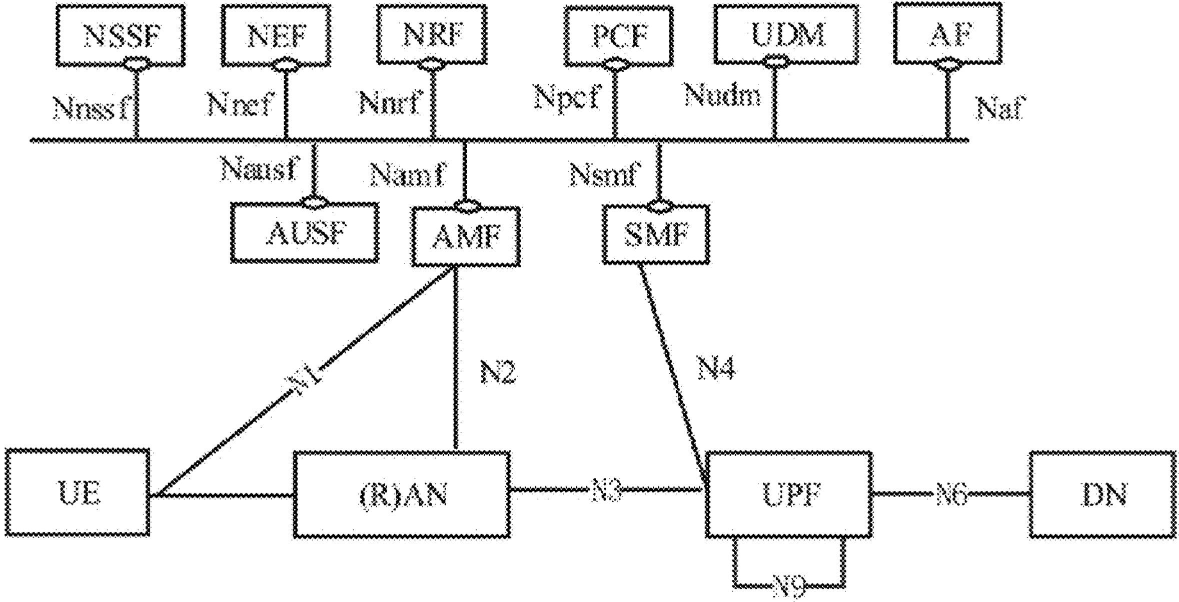
FIG. 20 is a block diagram illustrating an exemplary 5G system architecture for a non-roaming scenario.

FIG. 20 illustrates a 5G NR non-roaming reference architecture (see TS 23.501 v16.1.0, section 4.23). An Application Function (AF) (e.g., an external application server hosting 5G services, exemplarily described in FIG. 19) interacts with the 3GPP Core Network in order to provide services, for example to support application influencing on traffic routing, accessing Network Exposure Function (NEF) or interacting with the policy framework for policy control (e.g., QoS control) (see Policy Control Function, PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 20 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN, e.g., operator services, Internet access, or third party services). All of or a part of the core network functions and the application services may be deployed and running on cloud computing environments.

In the present disclosure, thus, an application server (e.g., AF of the 5G architecture), is provided that includes: a transmitter, which in operation, transmits a request containing a QoS requirement for at least one of URLLC, eMMB and mMTC services to at least one of functions (such as NEF, AMF, SMF, PCF, and UPF) of the 5GC to establish a PDU session including a radio bearer between a gNodeB and a UE in accordance with the QoS requirement; and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IOT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A terminal according to an exemplary embodiment of the present disclosure includes: control circuitry, which, in operation, sets a first upper limit value of a frequency spacing in which a first reference signal is placed in a first bandwidth to be smaller than a second upper limit value of a frequency spacing in which a second reference signal is placed in a second bandwidth which is wider than the first bandwidth; and transmission circuitry, which, in operation, transmits the first reference signal, based on the first upper limit value.

In an exemplary embodiment of the present disclosure, the control circuitry controls frequency hopping for the first reference signal in units of transmission bands in each of which the second reference signal is placed in every unit time interval.

In an exemplary embodiment of the present disclosure, the control circuitry controls the frequency hopping for the first reference signal between a plurality of symbols in which a plurality of the first reference signals is placed in the unit time interval.

In an exemplary embodiment of the present disclosure, the control circuitry controls the frequency hopping for the first reference signal in every frequency hopping period for the second reference signal.

In an exemplary embodiment of the present disclosure, the first bandwidth is less than a threshold value while the second bandwidth is equal to or greater than the threshold value, in which the threshold value is four resource blocks.

In an exemplary embodiment of the present disclosure, the first upper limit value is equal to or less than four subcarriers, in a case where the first bandwidth is two resource blocks.

In an exemplary embodiment of the present disclosure, the first upper limit value is equal to or less than two subcarriers, in a case where the first bandwidth is one resource block.

A base station according to an exemplary embodiment of the present disclosure includes: control circuitry, which, in operation, sets a first upper limit value of a frequency spacing in which a first reference signal is placed in a first bandwidth to be smaller than a second upper limit value of a frequency spacing in which a second reference signal is placed in a second bandwidth which is wider than the first bandwidth; and reception circuitry, which, in operation, receives the first reference signal, based on the first upper limit value.

A communication method according to an exemplary embodiment of the present disclosure includes: setting, by a terminal, a first upper limit value of a frequency spacing in which a first reference signal is placed in a first bandwidth to be smaller than a second upper limit value of a frequency spacing in which a second reference signal is placed in a second bandwidth which is wider than the first bandwidth; and transmitting, by the terminal, the first reference signal, based on the first upper limit value.

A communication method according to an exemplary embodiment of the present disclosure includes: setting, by a base station, a first upper limit value of a frequency spacing in which a first reference signal is placed in a first bandwidth to be smaller than a second upper limit value of a frequency spacing in which a second reference signal is placed in a second bandwidth which is wider than the first bandwidth; and receiving, by the base station, the first reference signal, based on the first upper limit value.

The disclosure of Japanese Patent Application No. 2020-121431, filed on Jul. 15, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 Base station
101, 203 Controller
102 Encoder/modulator
103, 205 Transmission processor
104, 206 Transmitter
105, 201 Receiver
106, 202 Reception processor
107 Data signal receiver
108 Reference signal receiver
200 Terminal
204 Reference signal generator

The invention claimed is:

1. A terminal, comprising:

control circuitry, which, in operation, determines a sequence length of a reference signal based on a number of transmission combs; and a transmitter, which, in operation, transmits the reference signal, wherein a bandwidth of the reference signal is selected from a plurality of bandwidths including a first bandwidth and a second bandwidth different from the first bandwidth, and a same lower limit threshold value for the sequence length is applied to determination of the sequence length of the reference signal for the first bandwidth and to determination of the sequence length of the reference signal for the second bandwidth.

2. The terminal according to claim 1, wherein a first upper limit of the number of transmission combs for the first bandwidth is smaller than a second upper limit of the number of transmission combs for the second bandwidth.

3. The terminal according to claim 2, wherein in a case the first bandwidth is 2 resource blocks and the second bandwidth is 4 resource blocks, the first upper limit value is 4 and the second upper limit value is 8.

4. The terminal according to claim 1, wherein the first bandwidth is smaller than the second bandwidth.

5. The terminal according to claim 1, wherein the larger the number of transmission combs is, the shorter the sequence length is.

6. The terminal according to claim 1, wherein the first bandwidth is less than 4 resource blocks, and the second bandwidth is equal to or more than 4 resource blocks.

7. The terminal according to claim 1, wherein the reference signal is transmitted based on a first frequency hopping for the first bandwidth or on a second frequency hopping for the second bandwidth, and a cycle of the first frequency hopping is longer than a cycle of the second frequency hopping.

8. The terminal according to claim 1, wherein the reference signal is transmitted based on a first frequency hopping for the first bandwidth or on a second frequency hopping for the second bandwidth, and the first frequency hopping is comprised of the second frequency hopping and an additional frequency hopping relating to a starting position of the second bandwidth.

9. The terminal according to claim 1, wherein the reference signal is transmitted based on a first frequency hopping for the first bandwidth or on a second frequency hopping for the second bandwidth, and an amount of each hopping on the first frequency hopping is same as an amount of each hopping on the second frequency hopping in a cycle of the second frequency hopping.

10. A communication method, comprising:

determining a sequence length of a reference signal based on a number of transmission combs; and transmitting the reference signal, wherein a bandwidth of the reference signal is selected from a plurality of bandwidths including a first bandwidth and a second bandwidth different from the first bandwidth, and a same lower limit threshold value for the sequence length is applied to determination of the sequence length of the reference signal for the first bandwidth and to determination of the sequence length of the reference signal for the second bandwidth.

11. A base station, comprising:

a transmitter, which, in operation, transmits control information indicating a number of transmission combs; and a receiver, which, in operation, receives a reference signal with a sequence length determined based on the number of transmission combs, wherein a bandwidth of the reference signal is selected from a plurality of bandwidths including a first bandwidth and a second bandwidth different from the first bandwidth, and a same lower limit threshold value for the sequence length is applied to determination of the sequence length of the reference signal for the first bandwidth and to determination of the sequence length of the reference signal for the second bandwidth.

12. The base station according to claim 11, wherein a first upper limit of the number of transmission combs for the first bandwidth is smaller than a second upper limit of the number of transmission combs for the second bandwidth.

13. The base station according to claim 12, wherein in a case the first bandwidth is 2 blocks and the second bandwidth is 4 resource blocks, the first upper limit value is 4 and the second upper limit value is 8.

14. The base station according to claim 11, wherein the first bandwidth is smaller than the second bandwidth.

15. The base station according to claim 11, wherein the larger the number of transmission combs is, the shorter the sequence length is.

16. The base station according to claim 11, wherein the first bandwidth is less than 4 resource blocks, and the second bandwidth is equal to or more than 4 resource blocks.

17. The base station according to claim 11, wherein the reference signal is transmitted based on a first frequency hopping for the first bandwidth or on a second frequency hopping for the second bandwidth, and a cycle of the first frequency hopping is longer than a cycle of the second frequency hopping.

18. The base station according to claim 11, wherein the reference signal is transmitted based on a first frequency hopping for the first bandwidth or on a second frequency hopping for the second bandwidth, and the first frequency hopping is comprised of the second frequency hopping and an additional frequency hopping relating to a starting position of the second bandwidth.

19. The base station according to claim 11, wherein the reference signal is transmitted based on a first frequency hopping for the first bandwidth or on a second frequency hopping for the second bandwidth, and an amount of each hopping on the first frequency hopping is same as an amount of each hopping on the second frequency hopping in a cycle of the second frequency hopping.

20. A communication method, comprising:

transmitting control information indicating a number of transmission combs; and receiving a reference signal with a sequence length determined based on the number of transmission combs, wherein a bandwidth of the reference signal is selected from a plurality of bandwidths including a first bandwidth and a second bandwidth different from the first bandwidth, and a same lower limit threshold value for the sequence length is applied to determination of the sequence length of the reference signal for the first bandwidth and to determination of the sequence length of the reference signal for the second bandwidth.

21. An integrated circuit, comprising:

control circuitry, which, in operation, controls determining a sequence length of a reference signal based on a number of transmission combs; and transmission circuitry, which, in operation, controls transmitting the reference signal, wherein a bandwidth of the reference signal is selected from a plurality of bandwidths including a first bandwidth and a second bandwidth different from the first bandwidth, and a same lower limit threshold value for the sequence length is applied to determination of the sequence length of the reference signal for the first bandwidth and to determination of the sequence length of the reference signal for the second bandwidth.

22. An integrated circuit, comprising:

transmission circuitry, which, in operation, controls transmitting control information indicating a number of transmission combs; and reception circuitry, which, in operation, controls receiving a reference signal with a sequence length determined based on the number of transmission combs, wherein a bandwidth of the reference signal is selected from a plurality of bandwidths including a first bandwidth and a second bandwidth different from the first bandwidth, and a same lower limit threshold value for the sequence length is applied to determination of the sequence length of the reference signal for the first bandwidth and to determination of the sequence length of the reference signal for the second bandwidth.

* * * * *